US010446113B2

(12) United States Patent
Tahmasebi

(10) Patent No.: US 10,446,113 B2
(45) Date of Patent: Oct. 15, 2019

(54) METHOD AND SYSTEM FOR INVERSION OF RASTER IMAGES

(71) Applicant: ForeFlight LLC, Houston, TX (US)

(72) Inventor: Joshua Aron Tahmasebi, Austin, TX (US)

(73) Assignee: ForeFlight LLC, Houston, TX (US)

(*) Notice: Subject to any disclaimer, the term of this patent is extended or adjusted under 35 U.S.C. 154(b) by 0 days.

(21) Appl. No.: 15/883,417

(22) Filed: Jan. 30, 2018

(65) Prior Publication Data
US 2019/0237043 A1 Aug. 1, 2019

(51) Int. Cl.
G09G 5/02 (2006.01)
G09G 5/10 (2006.01)

(52) U.S. Cl.
CPC .............. G09G 5/026 (2013.01); G09G 5/10 (2013.01); G09G 2320/066 (2013.01); G09G 2320/0626 (2013.01); G09G 2340/0492 (2013.01); G09G 2340/12 (2013.01); G09G 2360/144 (2013.01); G09G 2380/12 (2013.01)

(58) Field of Classification Search
CPC .................................................. G09G 5/026
USPC ....................................................... 345/619
See application file for complete search history.

(56) References Cited

U.S. PATENT DOCUMENTS

| 5,809,179 | A * | 9/1998 | Marimont | G06T 7/12 382/173 |
| 6,850,338 | B1 * | 2/2005 | Aschenbrenner | G06K 15/02 358/1.15 |
| 7,609,883 | B1 * | 10/2009 | Warnock | H04N 1/60 358/461 |
| 2005/0285876 | A1 * | 12/2005 | Balaga | G06T 3/0062 345/629 |
| 2006/0072799 | A1 * | 4/2006 | McLain | G06T 5/009 382/128 |
| 2006/0114218 | A1 * | 6/2006 | Ho | G09G 3/3406 345/102 |
| 2006/0170693 | A1 * | 8/2006 | Bethune | G06T 3/40 345/568 |
| 2006/0206264 | A1 * | 9/2006 | Rasmussen | G01C 21/32 701/455 |
| 2007/0167150 | A1 * | 7/2007 | Hutcheson | G06Q 20/102 455/405 |
| 2008/0192066 | A1 * | 8/2008 | Chang | G06F 3/13 345/601 |
| 2009/0271719 | A1 * | 10/2009 | Clare | G09B 29/007 715/762 |
| 2010/0007665 | A1 * | 1/2010 | Smith | G06T 13/40 345/473 |

(Continued)

OTHER PUBLICATIONS

"How to Turn Day Into Night in Adobe Photoshop" by Monika Zagrobelna Sep. 26, 2017.*

Primary Examiner — Javid A Amini
(74) Attorney, Agent, or Firm — Ferguson Braswell Fraser Kubasta PC

(57) ABSTRACT

A method for inverting raster image-based maps. The method includes obtaining an original raster image of a map and making a determination that nighttime conditions apply. Based on the determination, a processed raster image of the map is obtained by obtaining an intermediate representation in which the hue of the original raster image is inverted and by inverting the hue and tone of the intermediate representation. Subsequently, the processed raster image is displayed.

20 Claims, 6 Drawing Sheets

(56) References Cited

U.S. PATENT DOCUMENTS

| | | | |
|---|---|---|---|
| 2010/0141555 A1* | 6/2010 | Rorberg | G02B 27/017 345/8 |
| 2012/0200694 A1* | 8/2012 | Garsha | G01N 21/6456 348/79 |
| 2014/0358011 A1* | 12/2014 | Jiang | G06T 7/0012 600/476 |
| 2015/0091901 A1* | 4/2015 | Chiba | G06T 11/60 345/419 |
| 2017/0040004 A1* | 2/2017 | He | G09G 5/377 |
| 2017/0160171 A1* | 6/2017 | Tsujikawa | G06T 7/136 |
| 2017/0287196 A1* | 10/2017 | Raeburn | G06T 15/04 |
| 2018/0014734 A1* | 1/2018 | Rogers | A61B 5/0048 |

* cited by examiner

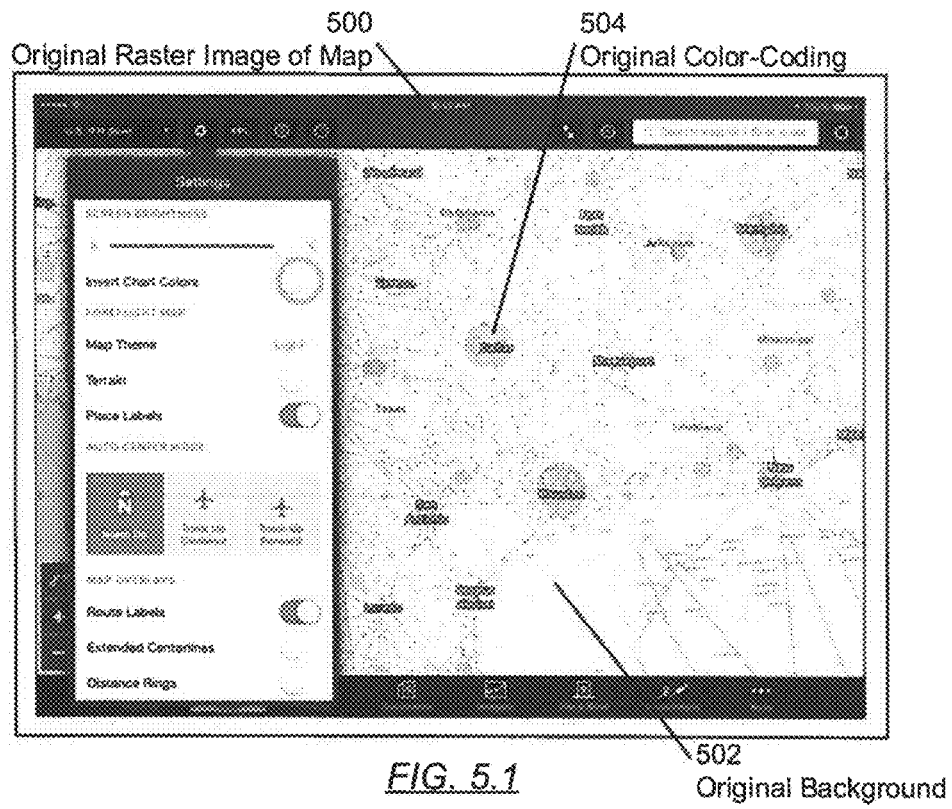
FIG. 5.1
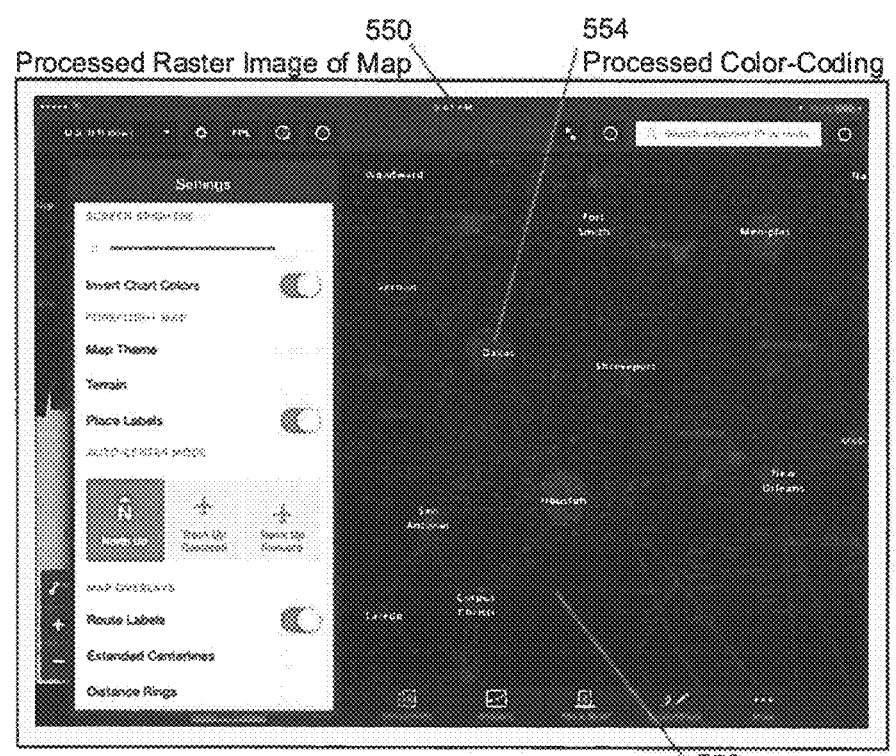
FIG. 5.2

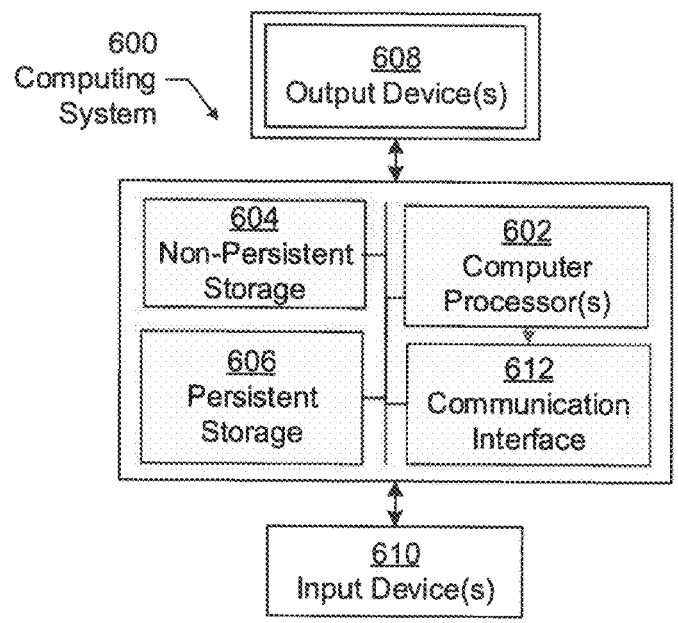
FIG. 6.1
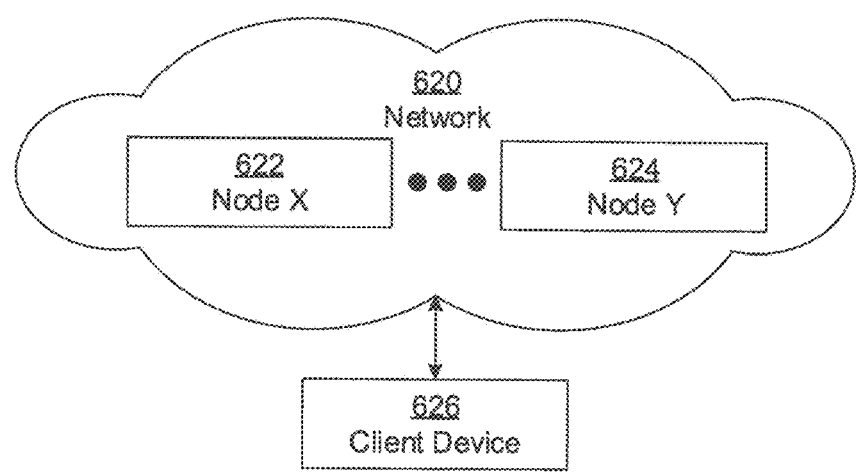
FIG. 6.2

METHOD AND SYSTEM FOR INVERSION OF RASTER IMAGES

BACKGROUND

Maps, which used to be primarily paper-based, are increasingly displayed to users on screens of electronic devices such as smartphones and tablets. Such on-screen maps may be raster images that mimic the look of paper-based maps, in particular if the on-screen maps have been derived from the corresponding paper-based maps. On-screen maps may have various advantages such as the ability to zoom, pan, scale fonts, etc.

SUMMARY

In general, in one aspect, one or more embodiments relate to a method for inverting raster image-based maps, comprising: obtaining an original raster image of a map; making a determination that nighttime conditions apply, and based on the determination: obtaining a processed raster image of the map by: obtaining an intermediate representation by inverting the hue of the original raster image; inverting the hue and tone of the intermediate representation; and displaying the processed raster image.

In general, in one aspect, one or more embodiments relate to a system for inverting raster image-based maps, comprising: a computer processor; a rendering engine executing on the computer processor configured to: obtain an original raster image of a map; make a determination that nighttime conditions apply, and based on the determination: obtain a processed raster image of the map by: obtaining an intermediate representation by inverting the hue of the original raster image; inverting the hue and tone of the intermediate representation; and a display displaying the processed raster image.

In general, in one aspect, one or more embodiments relate to a non-transitory computer readable medium including computer readable program code for causing a computer system to obtain an original raster image of a map; make a determination that nighttime conditions apply, and based on the determination: obtain a processed raster image of the map by: obtaining an intermediate representation by inverting the hue of the original raster image; inverting the hue and tone of the intermediate representation; and display the processed raster image.

Other aspects of the disclosed invention will be apparent from the following description and the appended claims.

BRIEF DESCRIPTION OF DRAWINGS

FIG. 5.1 shows an exemplary on-screen map rendered for daytime conditions, in accordance with one or more embodiments of the invention.

FIG. 5.2 shows an exemplary on-screen map rendered for nighttime conditions, in accordance with one or more embodiments of the invention.

FIGS. 6.1 and 6.2 show computing systems in accordance with one or more embodiments of the invention.

DETAILED DESCRIPTION

Figure 1:
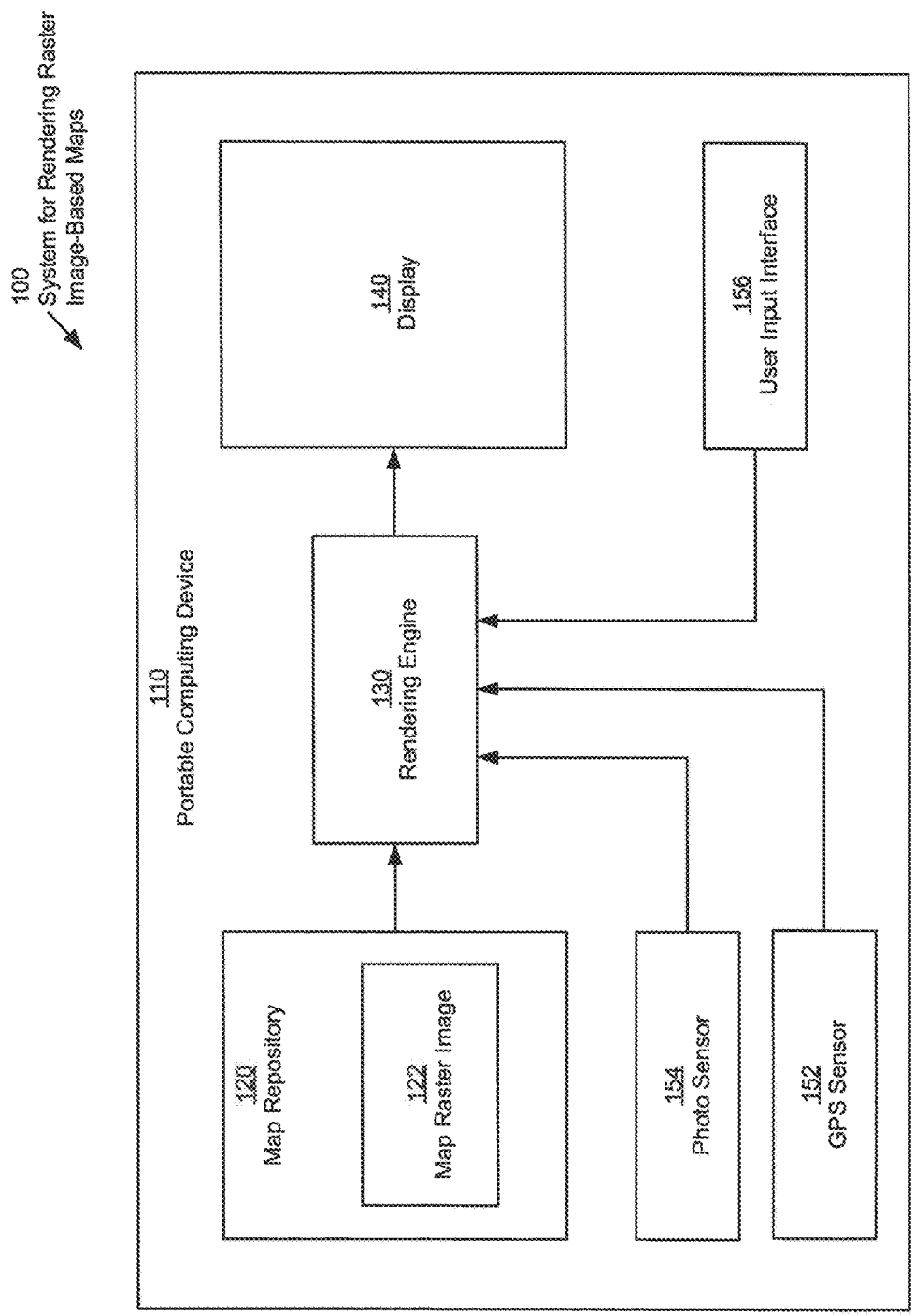
FIG. 1 shows a block diagram of an exemplary system for rendering raster image-based maps, in accordance with one or more embodiments of the invention.

Specific embodiments of the disclosed technology will now be described in detail with reference to the accompanying figures. Like elements in the various figures may be denoted by like reference numerals and/or like names for consistency.

The following detailed description is merely exemplary in nature, and is not intended to limit the disclosed technology or the application and uses of the disclosed technology. Furthermore, there is no intention to be bound by any expressed or implied theory presented in the preceding technical field, background, brief summary or the following detailed description.

In the following detailed description of embodiments of the disclosed technology, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the invention enable the inversion of raster image-based maps, and the displaying of the inverted raster image-based maps. Maps, which used to be primarily paper-based, are increasingly displayed to users on screens of electronic devices such as smartphones and tablets. Such on-screen maps may be raster images that mimic the look of paper-based maps, in particular if the on-screen maps have been derived from the corresponding paper-based maps. On-screen maps may have various advantages such as the ability to zoom, pan, scale fonts, etc. However, maps that are displayed on-screen have different visual characteristics than paper-based maps. For example, because the majority of display devices are actively illuminated, an on-screen map may act as a light source. In low-light environments, e.g. under nighttime conditions, this light source can be distracting or may cause glare, thereby possibly preventing dark adaptation of a user's visual system. This issue may be particularly problematic if a map includes significant white background, which on a display device would be brightly lit. In one or more embodiments of the invention, the color scheme of an image of the map is updated to invert the brightness (i.e. tone) of the image while preserving the hue and saturation of the image. Accordingly, a white background becomes black, whereas, for example, black text becomes white text. Maps frequently include color coding to provide additional information. For example, in aeronautical maps, various color coding may be used to indicate populated areas, navigational facilities, various types of airspace, restricted zones, terrain levels, etc. In one or more embodiments of the invention, this color coding is essentially preserved, thereby enabling a user to extract information from the color coding in the processed map, analogous to how the user would extract this information from a paper-based map, while avoiding above-described issues such as glare, associated with displaying the unprocessed map under nighttime conditions.

Turning to the figures, FIG. 1 is a block diagram of an exemplary system for rendering raster image-based maps (100), in accordance with embodiments of the invention. In one or more embodiments of the invention, the system for rendering raster image-based maps (100) includes a portable computing device (110). The portable computing device may be, for example, a table computer, a smartphone, or a laptop. Exemplary configurations of computing devices in accordance with one or more embodiments of the invention are described below, with reference to FIGS. 6.1 and 6.2. Alternatively, a permanently installed computing device may be used instead of the portable computing device, without departing from the invention. For example, in one or more embodiments of the invention, the computing device may be installed in a dashboard of a vehicle or in a cockpit of an airplane.

The portable computing device may include a map repository (120), a rendering engine (130), a display (140), a GPS sensor (152), a photo sensor (154) and a user input interface (156). Each of these components is subsequently described.

The map repository (120), in accordance with one or more embodiments of the invention stores one or more raster images (122). The map repository may be a local component, e.g., an image database or a directory that stores images, on the portable computing device (110). Alternatively, the map repository may be a remote component, e.g., an archive that is hosted on a server or in a cloud. Such an archive may be provided by a map service provider. In such a scenario, the portable computing device may remotely access the archive, e.g., using a wireless network interface, in order to obtain one or more raster images (122). The map repository (120) may be structured in any form suitable for storing raster images.

A raster image (122), in accordance with one or more embodiments of the invention is an image of a map. The raster image may be stored using an uncompressed or a compressed file format. File formats that may be used for storing the raster image include, but are not limited to ".bmp", ".tif", ".jpg", ".gif", ".png", and ".pdf". The map stored in the raster image (122) may be any kind of map or chart, e.g., a road map or an aeronautical map. Aeronautical maps, for example, may be provided by the Federal Aviation Administration as raster images. In one or more embodiments of the invention, additional content is associated with the map. This additional content may include, for example labels, symbols etc. This additional content may be provided in vector format in order to ensure scalability when zooming into and out of the map.

Figure 2:
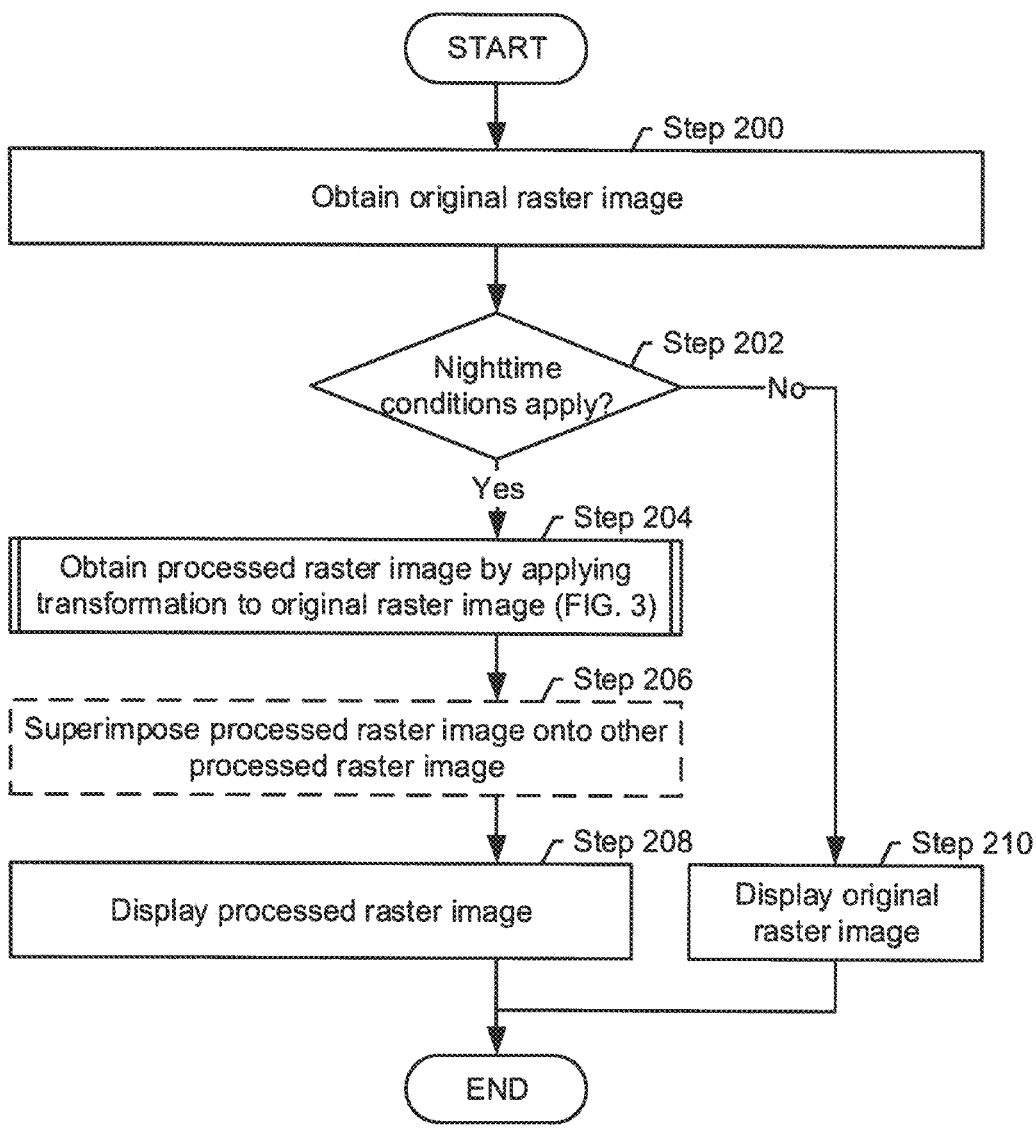
FIG. 2 shows a flowchart describing the rendering of raster image-based maps, in accordance with one or more embodiments of the invention.
Figure 3:
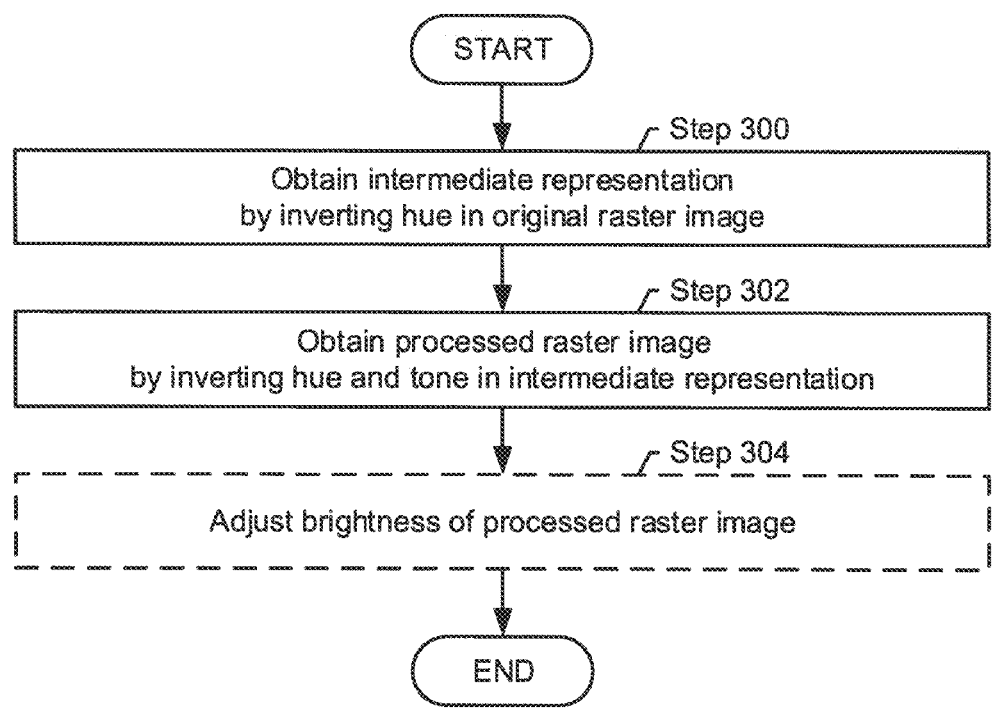
FIG. 3 shows a flowchart describing the application of a nighttime transformation on raster image-based maps, in accordance with one or more embodiments of the invention.

The rendering engine (130), in accordance with one or more embodiments of the invention, performs one or more of the steps described in FIGS. 2 and 3, i.e., the rendering engine generates a video signal that enables displaying of the raster image (122) based on the processing described in FIGS. 2 and 3, in the display (140). In one or more embodiments of the invention, the rendering engine (130) includes a graphics processor such as a graphics processing unit (GPU). The GPU may be instructed to perform at least one of the steps described in FIGS. 2 and 3. The GPU may be addressed using OpenGL or a similar application programming interface (API).

The display (140), in accordance with one or more embodiments of the invention, displays the raster image (122), after the processing by the rendering engine (130), to the user. The display (140) may be any type of display that may be installed in a portable device or alternatively in a dashboard or in a cockpit. The display may be, for example, and LCD display an LED display, and OLED display a CRT screen, etc. Other display technologies may be used without departing from the invention.

The GPS sensor (152), in accordance with one or more embodiments of the invention, provides location information to the portable computing device. The location information may be used to select a portion of the map to be displayed to the user. For example, only a certain area surrounding the current location of the portable computing device (110), provided by the GPS sensor, may be displayed. Accordingly, the GPS sensor (152) provides an input to the rendering engine (130), based on which the rendering engine may select a portion of the raster image (122) of the map to be displayed.

The photo sensor (154), in accordance with one or more embodiments of the invention, provides information about the available ambient light. The photo sensor signal may, thus, be used to determine whether daytime conditions or nighttime conditions are prevailing. The photo sensor may be, for example, a photo resistor, a photo diode, a photo transistor etc. Alternatively, the user may decide whether daytime or nighttime processing is desired.

The user input interface (156), in accordance with one or more embodiments of the invention, enables the user to control the displaying of the raster image of the map. The user interface may allow, for example, zooming, panning, the activation or deactivation of layers the selection of daytime or nighttime processing, etc. The user interface may be, for example, a touch screen that may be integrated with the display (140), a keyboard, a touchpad, or any other type of input device.

While FIG. 1 shows a configuration of components, other configurations may be used without departing from the scope of the disclosed technology. For example, various components may be combined to create a single component. As another example, the functionality performed by a single component may be performed by two or more components. Accordingly, for at least the above-recited reasons, embodiments of the disclosed technology should not be considered limited to the specific arrangements of components and/or elements shown in FIG. 1.

FIGS. 2 and 3 show flowcharts in accordance with one or more embodiments of the invention. While the various steps in these flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 2 and 3 may be performed in parallel with any other steps shown in FIGS. 2 and 3, without departing from the invention.

FIG. 2 describes a method for inversion of raster images. The method may be performed whenever a user accesses a map that is stored as a raster image. In one or more embodiments of the invention, one or more of the steps described in FIG. 2 may be performed in real-time, e.g., as a map is updated. Such updating may occur for various reasons, including but not limited to, the user zooming into the map, the user selecting a different area of the map, the user moving to a different location, as detected by the GPS sensor, etc. Accordingly, some or all of the described steps may be performed sufficiently fast to support a desired frame rate, e.g., 30 frames per second.

In Step 200, an original raster image is obtained. The original raster image may be a map, and the original raster image of the map may be obtained upon user request, e.g., when the user opens the map on a portable device. The original raster image may be obtained from a map repository that may be local, i.e., on the portable device, or remote, e.g. on a server or in the cloud.

In Step 202, a determination is made about whether nighttime conditions apply. The determination may be made based on a photo sensor reporting low light conditions, or based on the user selecting a nighttime display mode. If a determination is made that nighttime conditions apply, the method may proceed to Step 204.

In Step 204, a processed raster image is obtained by applying a transformation to the original raster image. Step 204 is further described in FIG. 3. In one or more embodiments of the invention, as a result of the processing, the processed raster image is considered more suitable for viewing under nighttime conditions than the original raster image, as discussed in detail below with reference to FIGS. 3-5.2.

In Step 206, the processed raster image is optionally superimposed onto another processed raster image. Assume, for example, that the original raster image (and therefore also the processed raster image) shows an approach plate, as it is used for instrument approach procedures of an airport. This approach plate may be superimposed on top of an enroute aeronautical chart which pilots rely on when flying under instrument flight rules during the en-route phase of the flight. While initially, en-route, only the enroute aeronautical chart may be displayed to the pilot. Later, as the pilot approaches the destination airport, the approach plate may be superimposed in order to provide the information the pilot needs for properly approaching the destination airport. Both the original enroute aeronautical chart and the original approach plate have a white background, and accordingly the obtained processed raster images have a black background. The superimposed processed raster image of the approach plate may, nevertheless, be readily distinguishable from the processed raster image of the enroute aeronautical chart by having the black background of the processed raster image of the approach plate slightly brightened as discussed in FIG. 3.

In Step 208, the processed raster image is displayed to the user.

Returning to Step 202, if a determination is made that nighttime conditions do not apply, the method may proceed to Step 210, in which the original raster image is displayed to the user.

FIG. 3 describes a method for obtaining a processed raster image by applying a transformation to an original raster image. The method of FIG. 3 is subsequently described with reference to FIG. 4, in which the outcomes of performing the steps described in FIG. 3 are illustrated.

Figure 4:
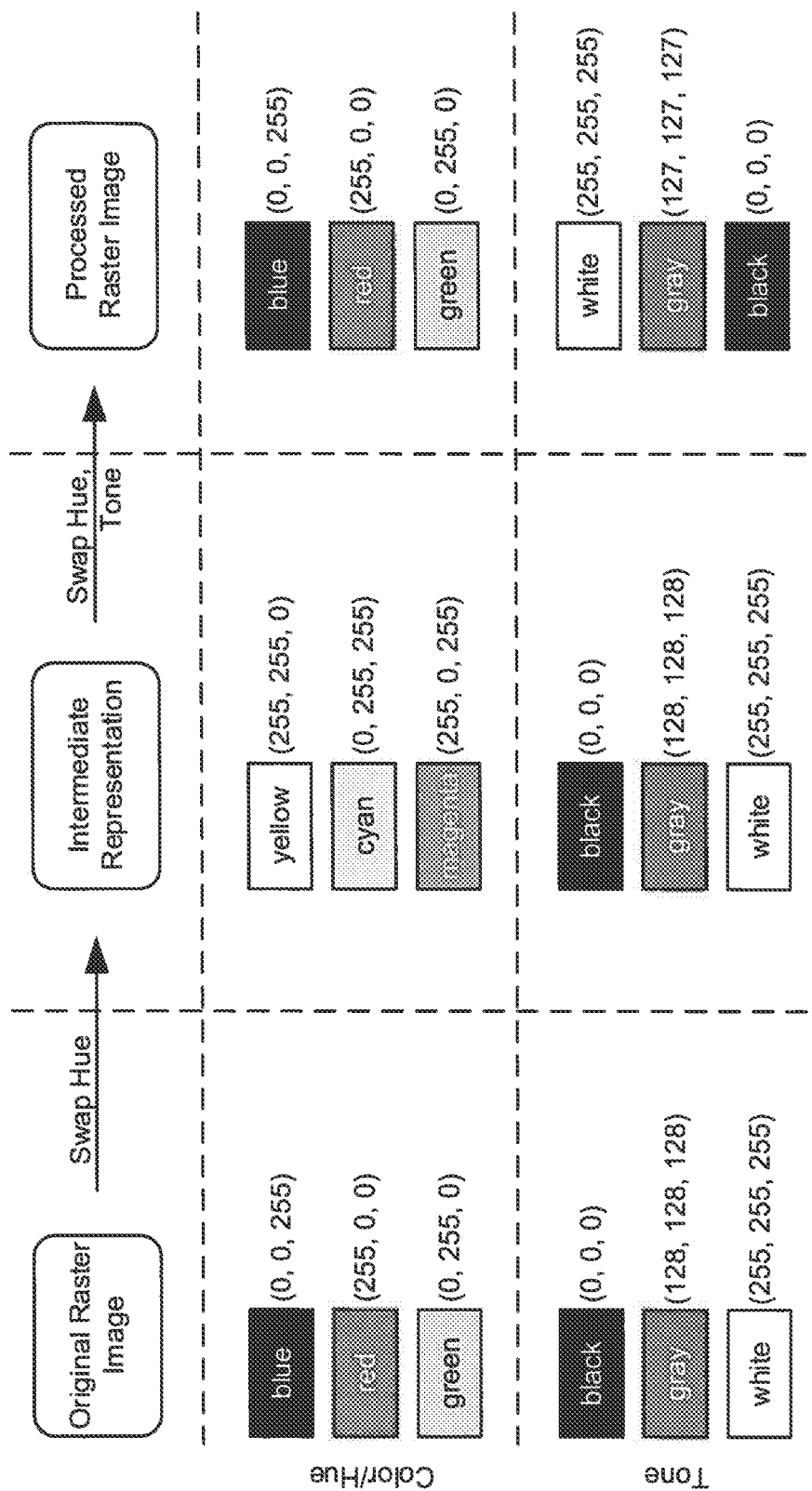
FIG. 4 shows a diagram, illustrating the steps of the flowchart in FIG. 3.

In Step 300, an intermediate representation is obtained by inverting the hue in the original raster image. FIG. 4 illustrates this step on six exemplary pixels. In the left column of FIG. 4, these pixels are shown in their original states: the first pixel is a blue pixel with the RGB value (0, 0, 255), the second pixel is a red pixel with the RGB value (255, 0, 0), the third pixel is a green pixel with the RGB value (0, 255, 0), the fourth pixel is a black pixel with the RGB value (0, 0, 0), the fifth pixel is a gray pixel with the RGB value (128, 128, 128), and the sixth pixel is a white pixel with the RGB value (255, 255, 255). Note that the first, second and third pixels are described as having a "hue", whereas the fourth, fifth and sixth pixels are described as having a tone. After the swapping of the hue in Step 300, the first pixel is a yellow pixel with the RGB value (255, 255, 0), the second pixel is a cyan pixel with the RGB value (0, 255, 255), and the third pixel is a magenta pixel with the RGB value (255, 0, 255). In contrast, the fourth, fifth and sixth pixel remain unaffected by the swapping of the hue. Accordingly, in Step 300, colors are replaced by their complementary colors, with no other changes being made. The result of the hue swapping is illustrated in the center column of FIG. 4.

The swapping of the hue in Step 300 may be performed as follows. First, the color information (e.g. represented in RGB format) may be converted to a Hue-Saturation-Value (HSV) color representation. Next, the hue may be rotated by 180°, while no changes may be made to the saturation and the value. Subsequently, the color information may be converted back to the original representation, e.g. the RGB format. These steps ensure that only the hue, but not the saturation and brightness are swapped.

In Step 302, the intermediate representation is further processed by inverting hue and tone to obtain the processed raster image. FIG. 4 illustrates this step. The center column shows the exemplary six pixels prior to performing Step 302, and the right column shows the same exemplary six pixels after performing Step 302. Prior to inverting hue and tone in Step 302, the first pixel is a yellow pixel with the RGB value (255, 255, 0), the second pixel is a cyan pixel with the RGB value (0, 255, 255), the third pixel is a magenta pixel with the RGB value (255, 0, 255), the fourth pixel is a black pixel with the RGB value (0, 0, 0); the fifth pixel is a gray pixel with the RGB value (128, 128, 128); and the sixth pixel is a white pixel with the RGB value (255, 255, 255). After the inversion of hue and tone, the first pixel is blue with the RGB value (0, 0, 255), the second pixel is red with the RGB value (255, 0, 0), the third pixel is green with the RGB value (0, 255, 0), the fourth pixel is white with the RGB value (255, 255, 255), the fifth pixel is gray with the RGB value (127, 127, 127), and the sixth pixel is black with the RGB value (0, 0, 0).

Accordingly, in Step 302, a negative of the intermediate representation is generated. The colors are, thus, reset to the colors of the original raster image, prior to performing Step 300, but in addition, the tones are also inverted, i.e. a pixel that was black becomes white, whereas a pixel that was white becomes black, etc. In the processed raster image, the hue is therefore identical with the hue of the original raster image, whereas the tone is inverted. The swapping of the hue and color in Step 302 may be performed by inverting the RGB values.

In Step 304, the brightness of the processed raster image is optionally adjusted. For example, the brightness may be increased to obtain a dark gray rather than a black background. The operation may be performed when superimposing a processed raster image on top of another raster image to enable distinction of the two raster images, as previously described. Further, the operation may be performed when desired by a user who wants to manually specify a brightness level.

In one or more embodiments of the invention, one or more of the operations are performed by a graphics processor. The graphics processor may be programmed to perform these operations using an application programming interface such as OpenGL. Accordingly, these operations may be performed in real-time, as the graphics processor is coordinating the presentation of content in the display.

FIGS. 5.1 and 5.2 illustrate the effect of executing the methods described in FIGS. 2 and 3. FIG. 5.1 shows an original raster image of a map (500), as it may be used under daytime conditions. The original raster image (500) includes an original background (502) and original color coding (504). During nighttime conditions, the bright original background (502) may be distracting and may cause glare. FIG. 5.2 shows a processed raster image of the map (550). The processed raster image (550) includes a processed background (552) and processed color coding (554). The processed background (552) is dark, thereby preventing glare or other distractions under nighttime conditions. The hue of the processed color coding (554) is identical to the hue of the original color coding (504).

Thus, unlike in simple image inversion approaches that invert hue and tone, the processing in accordance with one or more embodiments of the invention maintains color coding, while inverting tone only, thereby enabling a user of the map to recognize information that is represented by the color coding, while eliminating glare resulting from bright backgrounds. Embodiments of the invention allow to perform this operation in real-time, thus not requiring separate maps for daytime and nighttime use. While embodiments of the invention have been described in the context of processing maps, those skilled in the art will appreciated that any document may be processed as described, without departing from the invention.

Embodiments of the invention may be implemented on a computing system. Any combination of mobile, desktop, server, router, switch, embedded device, or other types of hardware may be used. For example, as shown in FIG. 6.1, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (600) in FIG. 6.1 may be connected to or be a part of a network. For example, as shown in FIG. 6.2, the network (620) may include multiple nodes (e.g., node X (622), node Y (624)). Each node may correspond to a computing system, such as the computing system shown in FIG. 6.1, or a group of nodes combined may correspond to the computing system shown in FIG. 6.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (600) may be located at a remote location and connected to the other elements over a network.

Although not shown in FIG. 6.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6.1. Further, the client device (626) may include and/or perform all or a portion of one or more embodiments of the invention.

The computing system or group of computing systems described in FIGS. 6.1 and 6.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 6.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query provided to a structured data repository (where the data repository may be organized according to a database schema or data format, such as XML).

The extracted data may be used for further processing by the computing system. For example, the computing system of FIG. 6.1, while performing one or more embodiments of the invention, may perform data comparison. Data comparison may be used to compare two or more data values (e.g., A, B). For example, one or more embodiments may determine whether $A>B$, $A=B$, $A \mathrel{!}=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 6.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6.1 may include functionality to provide raw and/or processed data, such as results of comparisons and other processing. For example, providing data may be accomplished through various presenting methods. Specifically, data may be provided through a user interface provided by a computing device. The user interface may include a GUI that displays information on a display device, such as a computer monitor or a touchscreen on a handheld computer device. The GUI may include various GUI widgets that organize what data is shown as well as how data is provided to a user. Furthermore, the GUI may provide data directly to the user, e.g., data provided as actual data values through text, or rendered by the computing device into a visual representation of the data, such as through visualizing a data model.

For example, a GUI may first obtain a notification from a software application requesting that a particular data object be provided within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be provided through various audio methods. In particular, data may be rendered into an audio format and provided as sound through one or more speakers operably connected to a computing device.

Data may also be provided to a user through haptic methods. For example, haptic methods may include vibrations or other physical signals generated by the computing system. For example, data may be provided to a user using a vibration generated by a handheld computer device with a predefined duration and intensity of the vibration to communicate the data.

The above description of functions presents only a few examples of functions performed by the computing system of FIG. 6.1 and the nodes and/or client device in FIG. 6.2. Other functions may be performed using one or more embodiments of the invention.

While the disclosed technology has been described with respect to a limited number of embodiments, those skilled in the art, having benefit of this disclosed technology, will appreciate that other embodiments can be devised which do not depart from the scope of the disclosed technology as disclosed herein. Accordingly, the scope of the disclosed technology should be limited only by the attached claims.

What is claimed is:

1. A method for inverting raster image-based maps, comprising:
    obtaining an original raster image of a map, the original raster image consisting of a plurality of pixels;
    obtaining a processed raster image of the map by, within a time slot allotted to generating an image frame of a plurality of consecutive image frames based on a frame rate:
        obtaining an intermediate representation by inverting the hue of each of the plurality of pixels of the original raster image, and
        inverting the hue and tone of each of the plurality of pixels of the intermediate representation; and
    displaying the processed raster image as the image frame.

2. The method of claim 1, further comprising displaying a background raster image, wherein the processed raster image is superimposed on top of the background raster image.

3. The method of claim 2, further comprising adjusting a brightness of the processed raster image to distinguish a background in the processed raster image from a background in the background raster image.

4. The method of claim 1, wherein obtaining the processed raster image of the map is performed based on an assessment of an available ambient light, using a photo sensor.

5. The method of claim 1, wherein obtaining the intermediate representation by inverting the hue of each of the plurality of pixels of the original raster image comprises:
    converting the original raster image to a Hue-Saturation-Value (HSV) color representation; and
    rotating a hue component of the HSV representation by 180 degrees.

6. The method of claim 1, wherein inverting the hue and tone of each of the plurality of pixels of the intermediate representation comprises:
    converting the intermediate representation to an RGB color representation; and
    inverting the RGB color representation.

7. The method of claim 1, wherein the obtaining the processed raster image is performed in real-time.

8. The method of claim 1, wherein the map is an aviation map.

9. A system for inverting raster image-based maps, comprising:
   a computer processor;
   a rendering engine executing on the computer processor configured to:
      obtain an original raster image of a map, the original raster image consisting of a plurality of pixels;
      obtain a processed raster image of the map by, within a time slot allotted to generating an image frame of a plurality of consecutive image frames based on a frame rate:
         obtaining an intermediate representation by inverting the hue of each of the plurality of pixels of the original raster image, and
         inverting the hue and tone of each of the plurality of pixels of the intermediate representation; and
   a display displaying the processed raster image as the image frame.

10. The system of claim 9, further comprising a storage, wherein the storage comprises a map repository, and wherein obtaining the original raster image of the map comprises retrieving the original raster image of the map from the map repository.

11. The system of claim 9, further comprising a communication interface, wherein obtaining the original raster image of the map comprises downloading the original raster image of the map from a remote map repository, using the communication interface.

12. The system of claim 9, further comprising a photo sensor configured to assess an available ambient light, wherein obtaining the processed raster image of the map is performed based on the assessment of the available ambient light.

13. The system of claim 9, further comprising a GPS sensor, and wherein obtaining the processed raster image of the map further comprises centering the map using data obtained from the GPS sensor.

14. The system of claim 9, wherein obtaining the intermediate representation by inverting the hue of each of the plurality of pixels of the original raster image comprises:
   converting the original raster image to a Hue-Saturation-Value (HSV) color representation; and
   rotating a hue component of the HSV representation by 180 degrees.

15. The system of claim 9, wherein inverting the hue and tone of each of the plurality of pixels of the intermediate representation comprises:
   converting the intermediate representation to an RGB color representation; and
   inverting the RGB color representation.

16. The system of claim 9, wherein the obtaining the processed raster image is performed in real-time.

17. A non-transitory computer readable medium comprising computer readable program code for causing a computer system to:
   obtain an original raster image of a map, the original raster image consisting of a plurality of pixels;
   obtain a processed raster image of the map by, within a time slot allotted to generating an image frame of a plurality of image frames based on a frame rate:
      obtaining an intermediate representation by inverting the hue of each of the plurality of pixels of the original raster image, and
      inverting the hue and tone of each of the plurality of pixels of the intermediate representation; and
   display the processed raster image as the image frame.

18. The non-transitory computer readable medium of claim 17, wherein the computer readable program code further causes the computer system to display a background raster image, wherein the processed raster image is superimposed on top of the background raster image.

19. The non-transitory computer readable medium of claim 17, wherein obtaining the intermediate representation by inverting the hue each of the plurality of pixels of the original raster image comprises:
   converting the original raster image to a Hue-Saturation-Value (HSV) color representation; and
   rotating a hue component of the HSV representation by 180 degrees.

20. The non-transitory computer readable medium of claim 17, wherein inverting the hue and tone of each of the plurality of pixels of the intermediate representation comprises:
   converting the intermediate representation to an RGB color representation; and
   inverting the RGB color representation.

* * * * *

UNITED STATES PATENT AND TRADEMARK OFFICE
CERTIFICATE OF CORRECTION

PATENT NO. : 10,446,113 B2
APPLICATION NO. : 15/883417
DATED : October 15, 2019
INVENTOR(S) : Joshua Aron Tahmasebi Page 1 of 1

It is certified that error appears in the above-identified patent and that said Letters Patent is hereby corrected as shown below:

In the Claims

Claim 19, Column 14, Line 30, the word -- of -- should be inserted between the words "hue" and "each".

Signed and Sealed this
Twenty-fourth Day of November, 2020

Andrei Iancu
*Director of the United States Patent and Trademark Office*